(12) United States Patent
Ahn et al.

(10) Patent No.: US 9,024,838 B2
(45) Date of Patent: May 5, 2015

(54) MULTI-THROW ANTENNA SWITCH WITH OFF-STATE CAPACITANCE REDUCTION

(75) Inventors: Minsik Ahn, San Diego, CA (US); Chang-Ho Lee, San Diego, CA (US); Aristotele Hadjichristos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 13/570,908

(22) Filed: Aug. 9, 2012

(65) Prior Publication Data

US 2014/0043206 A1 Feb. 13, 2014

(51) Int. Cl.
*H01Q 3/24* (2006.01)
*H01Q 1/50* (2006.01)
*H04B 1/00* (2006.01)

(52) U.S. Cl.
CPC ............... *H01Q 1/50* (2013.01); *H04B 1/006* (2013.01); *H04B 1/406* (2013.01)

(58) Field of Classification Search
CPC .................................. H01Q 3/24; H01Q 1/50
USPC ......................................... 343/876, 850, 860
See application file for complete search history.

(56) References Cited

U.S. PATENT DOCUMENTS

| 6,118,985 | A | 9/2000 | Kawakyu et al. |
| 6,996,376 | B2 | 2/2006 | Clifton |
| 7,005,940 | B2 | 2/2006 | Kodim |
| 7,221,922 | B2 * | 5/2007 | Kemmochi et al. ........ 455/277.1 |
| 7,295,814 | B2 | 11/2007 | Yamashita et al. |
| 7,750,716 | B2 * | 7/2010 | Hosoya ........................ 327/308 |
| 7,884,779 | B2 * | 2/2011 | Haziza ........................ 343/876 |
| 7,890,891 | B2 | 2/2011 | Stuber et al. |
| 8,005,438 | B2 | 8/2011 | Chen |
| 2009/0153417 | A1 * | 6/2009 | Chen ............................ 343/702 |
| 2013/0295866 | A1 * | 11/2013 | Zuo et al. ..................... 455/269 |

FOREIGN PATENT DOCUMENTS

EP 1006669 A1 6/2000

OTHER PUBLICATIONS

International Search Report and Written Opinion—PCT/US2013/054416—ISA/EPO—Nov. 18, 2013.

\* cited by examiner

*Primary Examiner* — Hoang V Nguyen
(74) *Attorney, Agent, or Firm* — Ramin Mobarhan

(57) ABSTRACT

A multi-throw antenna switch with off-state capacitance reduction is disclosed. In an exemplary embodiment, an apparatus is provided that includes a plurality of first stage switches connected to an antenna, and a plurality of second stage switches connected to the plurality of first stage switches, each first stage switch connected in series to one or more second stage switches to form a plurality of switchable signal paths connected to the antenna.

20 Claims, 4 Drawing Sheets

MULTI-THROW ANTENNA SWITCH WITH OFF-STATE CAPACITANCE REDUCTION

BACKGROUND

1. Field

The present application relates generally to the operation and design of electronic circuits, and more particularly, to the operation and design of antenna switches.

2. Background

A conventional multi-throw antenna switch operates to receive signals having various power levels from an antenna and direct these signals to the appropriate processing circuitry. Increasing the number of antenna switch throws leads to high insertion loss at high frequency due to a large capacitance that appears in switch paths that are in the off-state. Additionally, each switch path may need to handle a different signal power level; however all the switches in a conventional antenna switch are typically designed to handle the highest expected signal power, thereby increasing cost and circuit size.

Accordingly, a multi-throw antenna switch is disclosed having off-state capacitance reduction for low insertion loss, reduced circuit size and lower cost.

BRIEF DESCRIPTION OF THE DRAWINGS

The foregoing aspects described herein will become more readily apparent by reference to the following description when taken in conjunction with the accompanying drawings wherein.

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
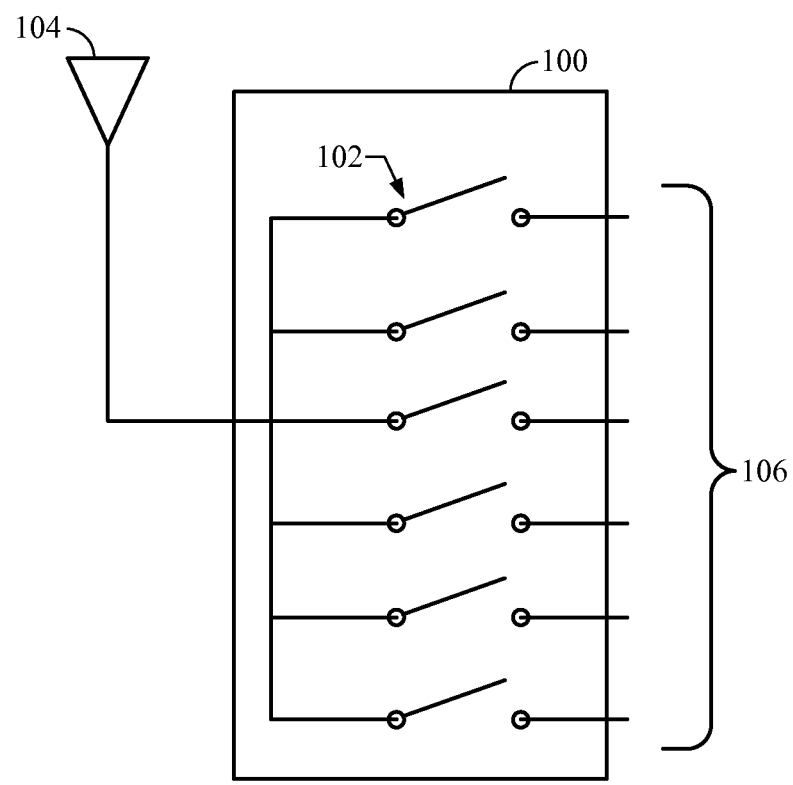
FIG. 1 shows a conventional multi-throw antenna switch.

FIG. 1 shows a conventional multi-throw antenna switch 100. The antenna switch 100 is comprised of a plurality of individual switches 102 with each switch having a connection to an antenna 104. The outputs 106 of the switches 102 are connected to various transmit and receive circuits (not shown).

During operation, one of the switches is enabled or "closed" to enable connection of the antenna 104 to one of the transmit/receive circuits. Due to the configuration of the switch 100, all individual switches 102 are generally designed to handle the highest power in the system. This means that each switch comprises a high breakdown voltage device that can be large and costly. Furthermore, when a switch is closed, the remaining open switches provide off-state capacitance. The parallel configuration of the switches 102 means that the off-state capacitance of the open switches 102 will combine to form a large capacitance value that appears at the antenna port and thus results in large insertion loss.

Figure 2:
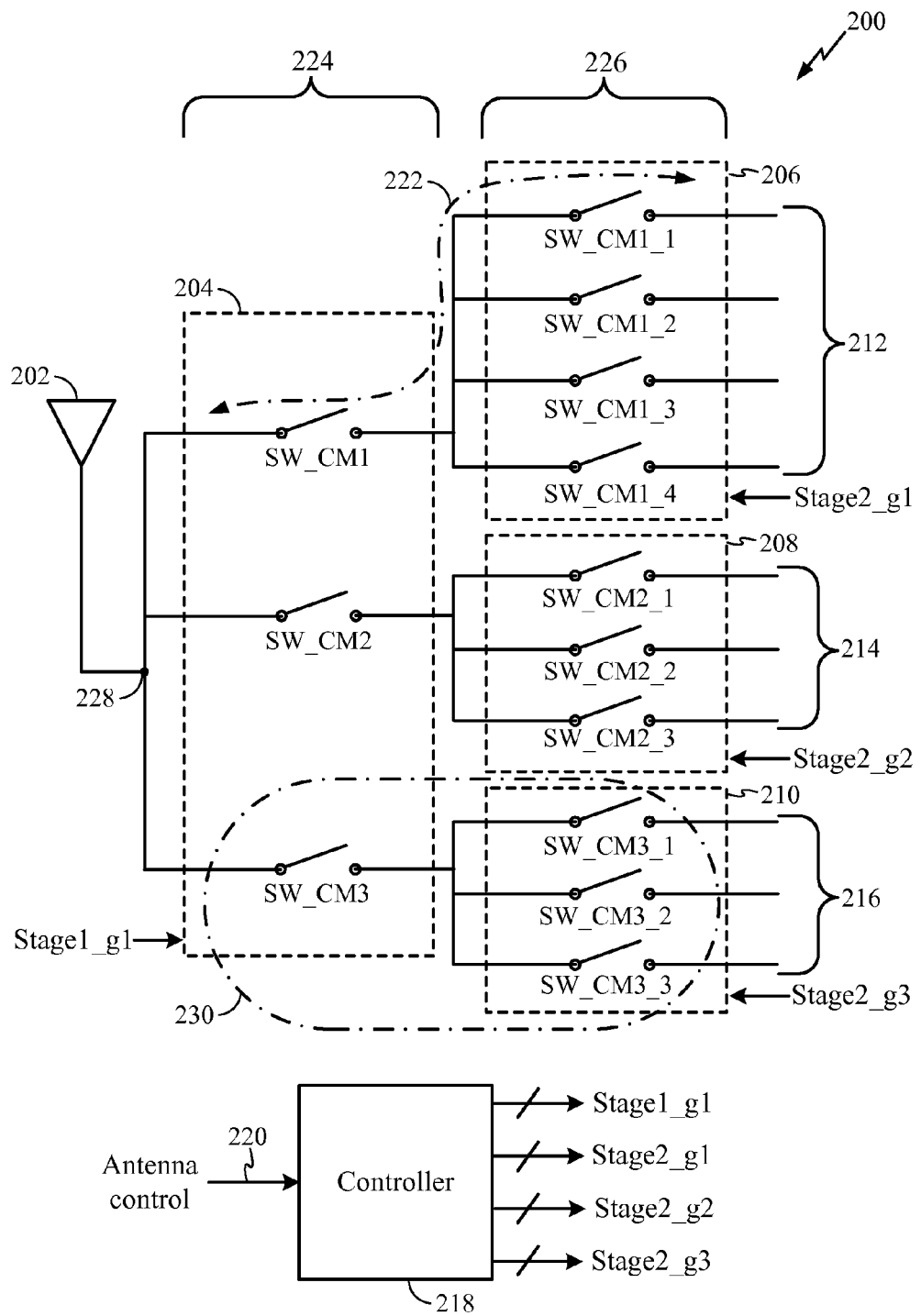
FIG. 2 shows an exemplary embodiment of a novel multi-throw antenna switch.

FIG. 2 shows an exemplary embodiment of a novel multi-throw antenna switch 200. For example, the switch 200 is suitable for use in a wireless device. The switch 200 comprises first stage switches 224 coupled to an antenna 202 and second stage switches 226 coupled to the first stage switches 224 to form a plurality of signal paths connected to the antenna 202. For example, the first stage switches 224 include one first stage switch group 204 that comprises three first stage switches (SW_CM1, SW_CM2, SW_CM3) coupled to the antenna 202. The second stage switches 226 include three second stage switch groups 206, 208, and 210 that comprise a plurality of second stage switches in each group. For example, the group 206 includes switches (SW_CM1_1, SW_CM1_2, SW_CM1_3, SW_CM1_4), the group 208 includes switches (SW_CM2_1, SW_CM2_2, SW_CM2_3), and the group 210 includes switches (SW_CM3_1, SW_CM3_2, SW_CM3_3).

The second stage switch groups 206, 208, and 210 have switch outputs 212, 214, and 216, respectively, connected to various transmit and receive circuits (not shown). In an exemplary embodiment, the switches in the second stage switch groups 206, 208, and 210 are coupled to switches in the first stage switch group 204 so as to reduce the off-state capacitance at antenna port 228. It should be noted that the switch 200 may be configured to include any number of first stage switch groups coupled to any number of second stage switch groups.

A controller 218 is provided that operates to control the switch 200. The controller 218 receives an antenna control signal 220 from another entity at the wireless device, such as a baseband processor. In an exemplary embodiment, the antenna control signal 220 is used by the controller 218 to generate four control signals that comprise one stage 1 control signal (Stage1_g1) and three stage 2 control signals (Stage2_g1, Stage2_g2, and Stage2_g3). The four control signals are connected to control the operation of the switches in the switch groups 204, 206, 208, and 210, as illustrated in FIG. 2. In an exemplary embodiment, each control signal comprises multiple control bits and each bit is used to open or close a corresponding switch. The controller 218 can be configured to generate any number of control signals to control any number of switch groups that may be used in the switch 200.

During operation, one or more of the first stage switches 224 and one or more of the second stage switches 226 are enabled or "closed" to provide one or more signal paths between the antenna 202 and selected transmit/receive circuitry at the wireless device. Due to the configuration of the switch 200, the remaining off-state (or open) switches combine to produce a reduced capacitance value resulting in the switch 200 having low insertion loss. For example, when selected switches of the first stage switches 224 and the second stage switches 226 are closed, the remaining open switches in the unconnected signal paths combine to produce lower off-state capacitance than the conventional multi-throw antenna switch shown in FIG. 1. For example, if switches SW_CM1 and SW_CM1_1 in path 222 are closed and the remaining switches are open, the total off-state capacitance at the antenna port 228 can be determined from the parallel combination of capacitances A, B, and C shown below, which can be expressed as (A//B//C).

A. The capacitance of the remaining unclosed switches in group 206 combined in parallel (referred to as SW_CM1_XX)
B. The capacitance of the first stage switch SW_CM2 combined in series with the capacitance of the unclosed switches of group 208 combined in parallel (referred to as SW_CM2_XX)
C. The capacitance of the first stage switch SW_CM3 combined in series with the capacitance of the unclosed switches of group 210 (referred to as SW_CM3_XX).

The above off-state capacitance result is lower than the conventional switch 100, which has an off-state capacitance equal to $[(n-1)*(SW\_CMX\_XX)]$, where n is equal to total number of switch throws at the antenna port. In various exemplary embodiments, the configuration of the switch 200 can be extended to antenna switches having a larger number of switch throws, such as SP14T or 16T.

In an exemplary embodiment, the individual switches in the first stage switch group 204 are designed to handle the highest power in the system, which means that each switch in the first stage switch group 204 comprises a high breakdown voltage device. However, the second stage switch groups 206, 208, and 210 comprise both high breakdown voltage (high power) and low breakdown voltage (low power) devices for increased efficiency. For example, the switches in the second stage switch group 206 have outputs 212 that are coupled to high power signal paths and therefore comprise high breakdown voltage devices. However, the switches in the second stage switch groups 208, 210 have outputs 214, 216 that are coupled to low power signal paths and therefore these switches comprise low breakdown voltage devices to conserve size and cost. Thus, the switch 200 provides for reduced cost and circuit size since at least one group of switches (i.e., groups 208 and 210 in this example,) can be configured with low breakdown voltage devices having smaller size and lower cost than larger devices typically used in conventional antenna switches. It should be noted that based on the expected signal power of the signal paths formed by the switch 200 any combination of high breakdown voltage and low breakdown voltage devices can be utilized to save space and reduce cost.

Therefore, in general, the total off-state capacitance of the switch 200 is determined from a parallel capacitance combination of capacitances associated with open switches of a plurality of switch branches, where each switch branch includes a first stage switch and all the second stage switches to which the first stage switch is serially connected. For example, switch branch 230 includes first stage switch (SW_CM3) and second stage switches (SW_CM3_1, SW_CM3_2, SW_CM3_3). Thus each switch branch has a capacitance determined from its open switches and the total off-state capacitance of the switch is determined from a parallel capacitance combination of the capacitances associated with all the switch branches.

Furthermore, the size and cost of the switch 200 can be reduced since one or more switches may comprise low breakdown voltage devices (i.e., 1.8V devices) designed for lower power signals. Additionally, the lower breakdown voltage devices also provide lower on-resistance (Ron) than the higher breakdown voltage devices. Thus, as more switch groups are designed to use lower breakdown voltage devices, the off-state capacitance of the switch 200 is further reduced.

In an exemplary embodiment, the antenna switch 200 comprises one first stage switch group (204) and three second stage switch groups (206, 208 and 210). However, it should be noted that other arrangements are possible within the scope of the various embodiments and that these other arrangement may provide even lower off-state capacitance. Therefore, the switch configurations are not limited to the exemplary embodiment shown in FIG. 2, and may be designed or configured to provide any number of first stage switch groups connected to any number of second stage switch groups. Each configuration can be designed to reduce the off-state capacitance of the switch and to utilize low breakdown voltage devices where appropriate to reduce size and cost.

Thus, in various exemplary embodiments, the novel multi-throw antenna switch 200 reduces off-state capacitance when compared with conventional antenna switches. Furthermore, the configuration of the switch 200 provides low power paths that use lower breakdown voltage devices so that low insertion loss is easier to achieve and offers additional off-state capacitance reduction as well as reduced circuit size and cost.

Figure 3:
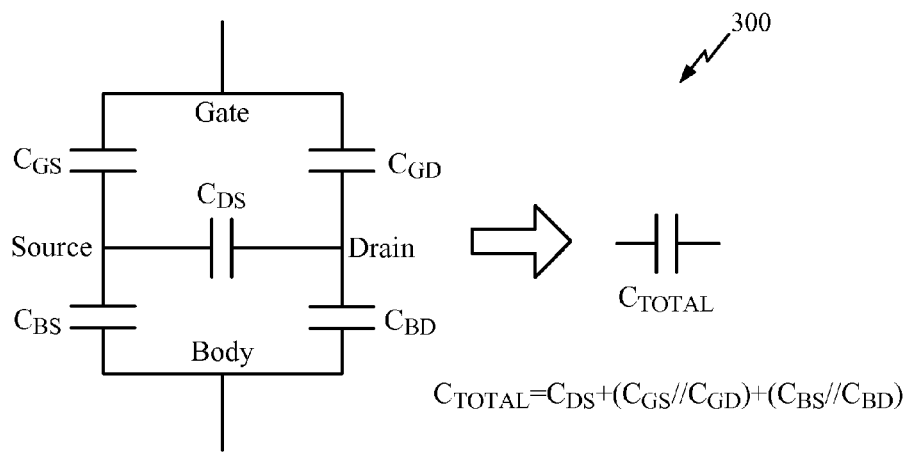
FIG. 3 shows an exemplary embodiment of a switch illustrating its associated off-state capacitance.

FIG. 3 shows an exemplary embodiment of a switch 300 illustrating its associated off-state capacitance. For example, the switch 300 comprises one of an NMOS or PMOS transistor implemented on an integrated circuit to form an integrated switch. Thus, the switch 300 is suitable for use as any of the switches in the antenna switch 200 shown in FIG. 2. The switch 300 comprises a plurality of internal capacitances that appear between the switch terminals. For example, the capacitance $C_{DS}$ appears between the source and drain terminals. The total off-state capacitance ($C_{TOTAL}$) of the switch 300 is determined from the combination of the internal capacitances. Thus, the total off-state capacitance ($C_{TOTAL}$) of any of the individual switches of the antenna switch 200 can be determined from the following expression.

$$C_{TOTAL}=C_{DS}+(C_{GS}//C_{GD})+(C_{BS}//C_{DB})$$

Figure 4:
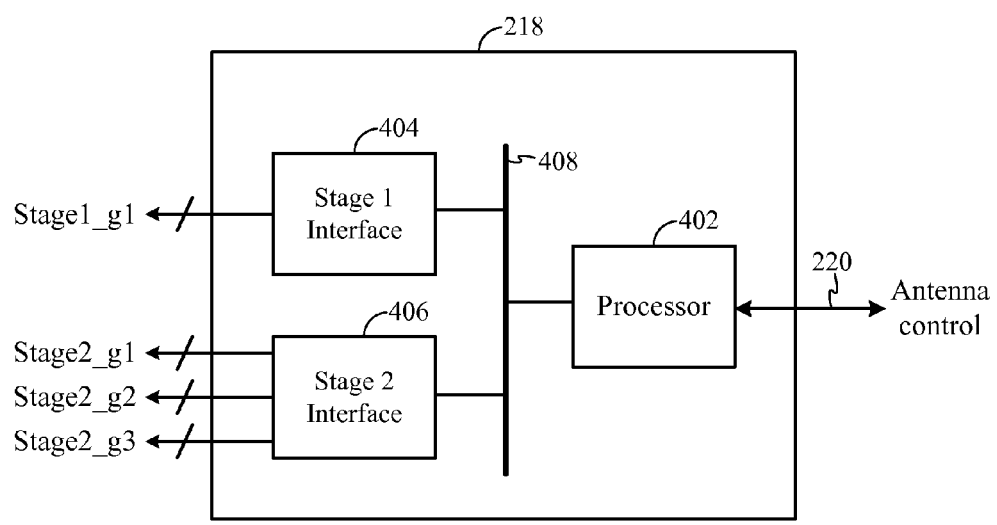
FIG. 4 shows an exemplary embodiment of a controller.

FIG. 4 shows an exemplary embodiment of the controller 218. The controller 218 comprises processor 402, Stage 1 interface 404, and Stage 2 interface 406 all coupled to communicate over bus 408. It should be noted that the controller 218 is just one implementation and that other implementations are possible.

The Stage 1 interface 404 comprises hardware and/or hardware executing software that operates to allow the controller 218 to select stage 1 switches to be open or closed. For example, the stage 1 interface 404 outputs the Stage1_g1 control signal that comprises one or more bits which can be used to control one or more stage 1 switches respectively. The stage 1 interface 404 is controlled by communicating with the processor 402 using bus 408.

The Stage 2 interface 406 comprises hardware and/or hardware executing software that operates to allow the controller 218 to select stage 2 switches to be open or closed. For example, the stage 2 interface 406 outputs the Stage2_g1, Stage2_g2, and Stage2_g3 control signals that comprises one or more bits which can be used to control one or more groups of stage 2 switches respectively. The stage 2 interface 406 is controlled by operation of the processor 402 using bus 408.

The processor 402 comprises at least one of a CPU, processor, gate array, hardware logic, memory elements, and/or hardware executing software. For example, the processor 402 executes instructions stored or embodied in an internal memory. The processor 402 operates to control the stage 1 interface 404 and the stage 2 interface 406 to perform the functions described herein.

In an exemplary embodiment, the processor 402 receives the antenna control signal 220 from a baseband processor or other entity and operates to control the stage 1 interface 404 and stage 2 interface 406 based on the antenna control signal 220 to generate the switch control signals Stage1_g1 Stage2_g1, Stage2_g2, and Stage2_g3 so as to close and open the appropriate switches to enable a desired antenna signal path while reducing the off-state capacitance associated with the open switches. It should be noted that the controller 218 is not limited to the implementation shown in FIG. 4 and in other exemplary embodiments the controller operates to generate more or less stage 1 and stage 2 control signals as necessary based on the antenna switch configuration.

Figure 5:
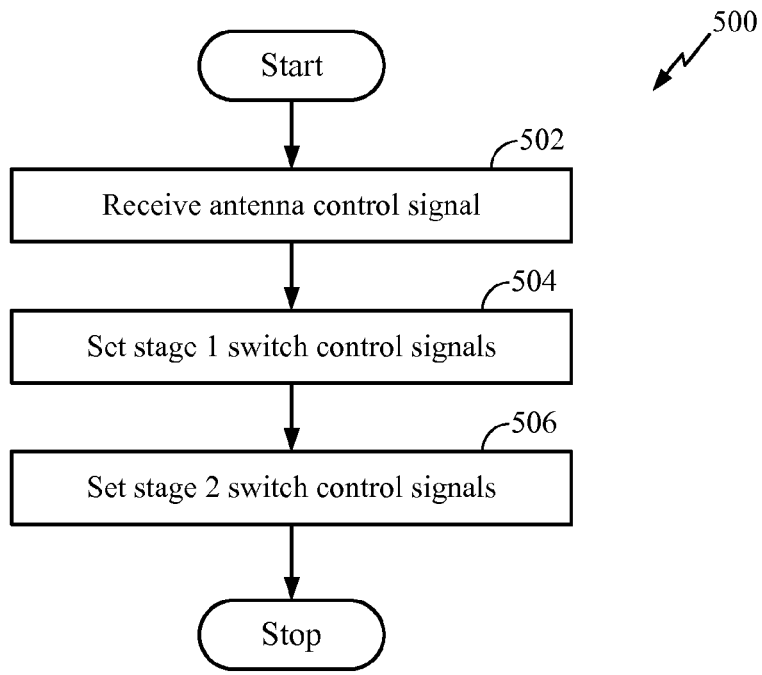
FIG. 5 shows an exemplary method for operating an antenna switch having multiple stages to reduce off-state capacitance.

FIG. 5 shows an exemplary method 500 for operating an antenna switch having multiple stages to reduce off-state capacitance. For example, the method 500 is suitable for use by the controller 218 shown in FIG. 2. In one implementation, the processor 402 executes one or more sets of codes or instructions to control the controller 218 to perform the functions described below.

At block 502, an antenna control signal is received by the processor 402. In an exemplary embodiment, the processor 402 receives the antennal control signal 220 from a baseband processor at a device. The processor 402 uses the antenna control signal to determine switch control settings for each stage and switch group of the antenna 200. For example, the antenna control signal indicates which signals paths are to be enabled and/or disabled. The processor 402 communicates with the stage 1 interface 404 and stage 2 interface 406 to enables and/or disables the appropriate stage 1 and stage 2 switches to activate and deactivate the appropriate signal paths.

At block 504, the stage 1 control signals are generated to open or close the appropriate stage 1 switches. For example, the stage 1 interface 404 outputs the Stage1_g1 signal that is coupled to enable/disable the stage 1 switches.

At block 506, the stage 2 control signals are generated to open or close the appropriate stage 2 switches. For example, the stage 2 interface 406 outputs the Stage2_g1, Stage2_g2, and Stage2_g3 signals that are coupled to enable/disable the stage 2 switches.

Therefore, the method 500 provides a method for operating an antenna switch having multiple stages to reduce off-state capacitance to provide reduced insertion loss. It should be noted that the method 500 is just one implementation and that the operations of the method 500 may be rearranged or otherwise modified such that other implementations are possible.

Figure 6:
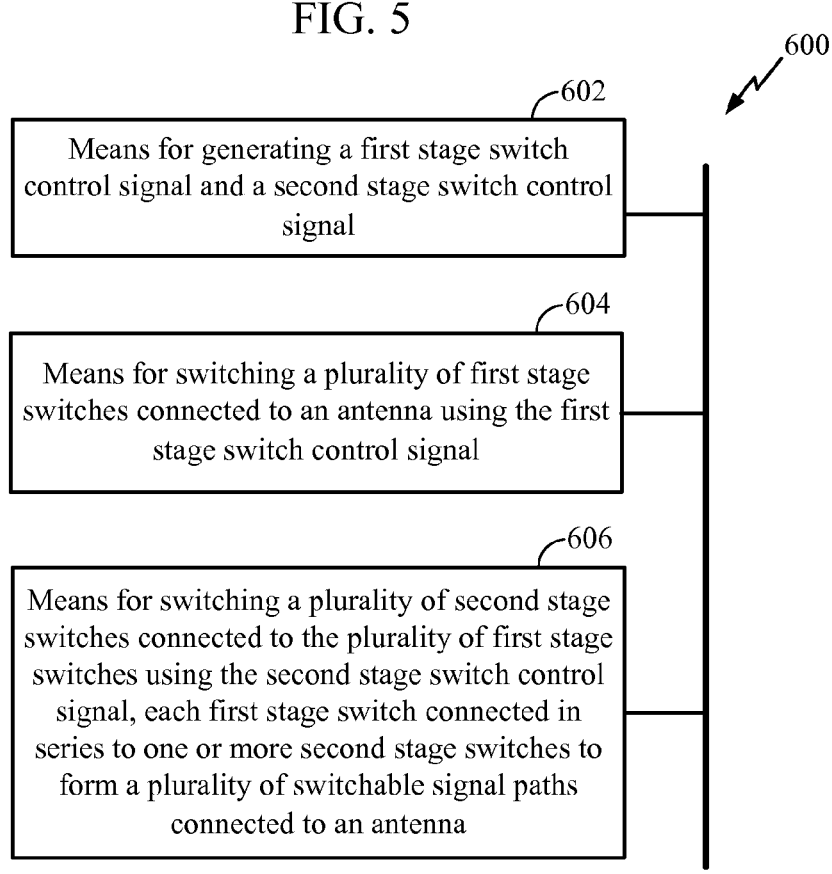
FIG. 6 shows an exemplary embodiment of an antenna switch apparatus.

FIG. 6 shows an exemplary embodiment of an antenna switch apparatus 600. For example, the apparatus 600 is suitable for use as the antenna switch 200 shown in FIG. 2. In an aspect, the switch apparatus 600 is implemented by one or more modules configured to provide the functions as described herein. For example, in an aspect, each module comprises hardware and/or hardware executing software.

The apparatus 600 comprises a first module comprising means (602) for generating a first stage switch control signal and a second stage switch control signal, which in an aspect comprises the controller 218.

The apparatus 600 also comprises a second module comprising means (604) for switching a plurality of first stage switches connected to an antenna using the first stage switch control signal, which in an aspect comprises one or more of the first stage switches 224.

The apparatus 600 also comprises a third module comprising means (606) for switching a plurality of second stage switches connected to the plurality of first stage switches using the second stage switch control signal, each first stage switch connected in series to one or more second stage switches to form a plurality of switchable signal paths connected to an antenna, which in an aspect comprises one or more of the second stage switches 226.

Those of skill in the art would understand that information and signals may be represented or processed using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. It is further noted that transistor types and technologies may be substituted, rearranged or otherwise modified to achieve the same results. For example, circuits shown utilizing PMOS transistors may be modified to use NMOS transistors and vice versa. Thus, the amplifiers disclosed herein may be realized using a variety of transistor types and technologies and are not limited to those transistor types and technologies illustrated in the Drawings. For example, transistors types such as BJT, GaAs, MOSFET or any other transistor technology may be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. An apparatus comprising:
   a plurality of first stage switches directly connected to an antenna; and
   a plurality of second stage switches connected to the plurality of first stage switches, each first stage switch directly connected in series to one or more second stage switches to form a plurality of switchable signal paths connected to the antenna.

2. The apparatus of claim 1, the plurality of switchable signal paths having at least one low power signal path that includes a selected second stage switch having a lower breakdown voltage than a selected first stage switch that is connected to the selected second stage switch.

3. The apparatus of claim 1, the plurality of second stage switches includes at least two switches having different breakdown voltages.

4. The apparatus of claim 1, further comprising a controller configured to generate switch control signals that couple to the first and second stage switches, the switch control signals configured to open or close any of the first and second stage switches to enable or disable selected switchable signal paths.

5. The apparatus of claim 4, the controller configured to generate the switch control signals from a received antenna control signal.

6. The apparatus of claim 1, the first and second stage switches configured as integrated switches that include one or more transistors selected from a set comprising PMOS and NMOS transistors.

7. The apparatus of claim 1, the plurality of first stage switches include two first stage switches that are connected in series to two second stage switch groups, respectively, each second stage switch group having a selected portion of the second stage switches.

8. The apparatus of claim 4, the controller configured to reduce insertion loss of the apparatus by controlling a total off-state capacitance of the apparatus determined from a parallel capacitance combination of capacitance values associated with the first and second stage switches that are controlled by the controller to be in an open state.

9. An apparatus comprising:
   means for generating a first stage switch control signal and a second stage switch control signal;
   means for directly connecting an antenna to a plurality of nodes on a plurality of first stage signal paths based on the first stage switch control signal; and
   means for directly connecting each node to a selected portion of a plurality of second stage switch outputs based on the second stage switch control signal to form a plurality of switchable signal paths between the antenna and the second stage switch outputs.

10. The apparatus of claim 9, the means for generating comprising means for generating the first stage switch control signal and the second stage switch control signal from an antenna control signal.

11. The apparatus of claim 9, the means for directly connecting the antenna includes a plurality of first stage switches connected between the antenna and the plurality of nodes and the means for directly connecting each node includes a plurality of second stage switches connected between the plurality of nodes and the plurality of second stage switch outputs.

12. The apparatus of claim 11, the means for generating configured to enable at least one low power signal path that includes a selected second stage switch having a lower breakdown voltage than a selected first stage switch that is connected to the selected second stage switch.

13. The apparatus of claim 11, the plurality of second stage switches includes at least two switches having different breakdown voltages.

14. The apparatus of claim 11, the first and second stage switches configured as integrated switches that include one or more transistors selected from a set comprising PMOS and NMOS transistors.

15. An apparatus comprising:
   a plurality of first stage switches connected to an antenna; and
   a plurality of second stage switches connected to the plurality of first stage switches, each first stage switch coupled in series to two or more second stage switches to form a plurality of switchable signal paths connected to the antenna, and at least two switches selected from the first and second stage switches have different breakdown voltages.

16. The apparatus of claim 15, the plurality of switchable signal paths having at least one low power signal path that includes a selected second stage switch having a lower breakdown voltage than a selected first stage switch that is coupled to the selected second stage switch.

17. The apparatus of claim 15, the plurality of second stage switches includes at least two switches having different breakdown voltages.

18. An apparatus comprising:
   a plurality of first stage switches connected to an antenna; and
   a plurality of second stage switches connected to the plurality of first stage switches, each first stage switch connected in series to one or more second stage switches to form a plurality of switchable signal paths connected to the antenna, and wherein the plurality of switchable signal paths having at least one low power signal path that includes a selected second stage switch having a lower breakdown voltage than a selected first stage switch that is connected to the selected second stage switch.

19. The apparatus of claim 18, the plurality of second stage switches includes at least two switches having different breakdown voltages.

20. The apparatus of claim 18, further comprising a controller configured to reduce insertion loss of the apparatus by controlling a total off-state capacitance of the apparatus determined from a parallel capacitance combination of capacitance values associated with the first and second stage switches that are controlled by the controller to be in an open state.

* * * * *